(12) United States Patent
Cho et al.

(10) Patent No.: US 11,174,861 B2
(45) Date of Patent: Nov. 16, 2021

(54) COMPRESSOR WITH DISCHARGE VALVE

(71) Applicant: SAMSUNG ELECTRONICS CO., LTD., Suwon-si (KR)

(72) Inventors: Sung Hea Cho, Suwon-si (KR); Yang Sun Kim, Anyang-si (KR); Jong Cheun Seo, Suwon-si (KR); Tae Yoon Kim, Suwon-si (KR); Tae Hoon Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 177 days.

(21) Appl. No.: 16/349,111

(22) PCT Filed: Nov. 16, 2016

(86) PCT No.: PCT/KR2016/013217
§ 371 (c)(1),
(2) Date: May 10, 2019

(87) PCT Pub. No.: WO2018/088605
PCT Pub. Date: May 17, 2018

(65) Prior Publication Data
US 2019/0277285 A1 Sep. 12, 2019

(30) Foreign Application Priority Data
Nov. 10, 2016 (KR) ........................ 10-2016-0149613

(51) Int. Cl.
F04C 18/02 (2006.01)
F04C 29/12 (2006.01)
(Continued)

(52) U.S. Cl.
CPC ...... F04C 18/0223 (2013.01); F04C 18/0215 (2013.01); F04C 18/0253 (2013.01);
(Continued)

(58) Field of Classification Search
CPC .............. F04C 18/0223; F04C 18/0215; F04C 18/0253; F04C 29/124; F04C 29/126;
(Continued)

(56) References Cited

U.S. PATENT DOCUMENTS 325,074 A * 8/1885 Gordon ................... F16K 15/00
137/315.33
2,169,052 A * 8/1939 Lindsey ................ F16K 15/025
137/843
(Continued)

FOREIGN PATENT DOCUMENTS

JP 2003-172274 6/2003
JP 2004-44502 2/2004
(Continued)

OTHER PUBLICATIONS

Extended European Search Report dated Oct. 1, 2019 in European Patent Application No. 16920933.5.
(Continued)

Primary Examiner — Deming Wan
(74) Attorney, Agent, or Firm — Staas & Halsey, LLP

(57) ABSTRACT

Provided is a compressor including a valve unit including: at least two guide pins passing through a discharge valve; and through holes allowing the guide pins to pass therethrough to control oblique motion of the discharge valve with respect to a horizontal direction during up and down movement of the discharge valve. When the discharge valve obliquely moves up and down with respect to the horizontal direction, the guide pin comes into contact with at least two points of an inner circumferential surface of the through hole so that the oblique movement of the discharge valve is restricted, thereby improving the durability of the discharge valve and reducing noise during operation of the compression.

14 Claims, 11 Drawing Sheets

(51) Int. Cl.
*F16K 15/02* (2006.01)
*F04C 28/24* (2006.01)
*F04C 28/10* (2006.01)
*F04C 29/02* (2006.01)
*F04C 29/06* (2006.01)
*F04C 23/00* (2006.01)

(52) U.S. Cl.
CPC ............ *F04C 29/06* (2013.01); *F04C 29/124* (2013.01); *F04C 29/126* (2013.01); *F04C 29/128* (2013.01); *F16K 15/021* (2013.01); *F04C 23/008* (2013.01)

(58) Field of Classification Search
CPC ........ F04C 29/128; F04C 29/12; F04C 29/02; F04C 28/10; F04C 28/24; F04C 23/008; F16K 15/021; F16K 15/023
See application file for complete search history.

(56) References Cited

U.S. PATENT DOCUMENTS

| | | | |
|---|---|---|---|
| 2,981,282 A * | 4/1961 | Mack | ....................... F16K 15/00 |
| | | | 137/516.29 |
| 3,530,880 A * | 9/1970 | Hune | .................. F24D 17/0078 |
| | | | 137/515.5 |
| 5,452,989 A | 9/1995 | Rood et al. | |
| 6,457,952 B1 | 10/2002 | Haller et al. | |
| 6,712,591 B2 * | 3/2004 | Lee | ..................... F04B 39/1026 |
| | | | 137/533.17 |
| 2006/0177336 A1 | 8/2006 | Hwang et al. | |

FOREIGN PATENT DOCUMENTS

| | | |
|---|---|---|
| KR | 10-0223432 | 7/1999 |
| KR | 10-0291990 | 3/2001 |

OTHER PUBLICATIONS

Chinese Office Action dated Apr. 21, 2020 in Chinese Patent Application No. 201680090762.2.
International Search Report dated Jul. 26, 2017 in corresponding International Application No. PCT/KR2016/013217.
Written Opinion of the International Searching Authority dated Jul. 26, 2017 in corresponding International Application No. PCT/KR2016/013217.
Chinese Office Action dated Mar. 1, 2021 from Chinese Application No. 201680090762.2, 16 pages.
European Office Action dated Mar. 24, 2021 from European Application No. 16920933.5, 4 pages.
Chinese Office Action dated Jun. 30, 2021 from Chinese Application No. 201680090762.2.

\* cited by examiner

COMPRESSOR WITH DISCHARGE VALVE

CROSS-REFERENCE TO RELATED APPLICATIONS

This application is a U.S. National Stage Application which claims the benefit under 35 U.S.C. § 371 of International Patent Application No. PCT/KR2016/013217 filed on Nov. 16, 2016, which claims foreign priority benefit under 35 U.S.C. § 119 of Korean Patent Application No. 10-2016-0149613 filed on Nov. 10, 2016 in the Korean Intellectual Property Office, the contents of both of which are incorporated herein by reference.

TECHNICAL FIELD

The present disclosure relates to a compressor, and more specifically, to a discharge structure of a scroll compressor.

BACKGROUND ART

A scroll compressor is a device for compressing a refrigerant by combining a fixed scroll and an orbiting scroll that have spiral wraps and make relative motion. The scroll compressor is more efficient than a reciprocating compressor or a rotary compressor, has lower vibration and noise, and has compact size and light weight, and thus is widely used in a refrigeration cycle apparatus.

The scroll compressor has a compression chamber formed by a fixed scroll accommodated in a sealed container and an orbiting scroll rotating with respect to a fixed scroll. The compression chamber has a width gradually decreasing from the outer circumferential side to the inner circumferential side according to rotation of the orbiting scroll. The refrigerant is suctioned from the outer circumferential side of the compression chamber to be compressed and then is discharged from the central portion of the compression chamber to the inside of the sealed container.

In order for the refrigerant discharged from the compression chamber to be prevented from flowing backward and suctioned again into the compression chamber, causing the compression chamber to be reversely rotated, a discharge valve is provided at a discharge port side to prevent the refrigerant from flowing backward.

DISCLOSURE

Technical Problem

The present disclosure provides an effective valve structure for controlling the back flow of a refrigerant when the operation of the compressor is stopped.

Technical Solution

According to an aspect of the present disclosure, there is provided The compressor according to the aspect of the present disclosure includes: a fixed scroll constituting a compression chamber together with an orbiting scroll and including a discharge port through which a refrigerant compressed in the compression chamber is discharged; and a valve unit including a discharge valve configured to open and close the discharge port by moving upward and downward and a first guide pin configured to guide the discharge valve, wherein the discharge valve includes a first through hole allowing the first guide pin to pass therethrough and the first through hole includes a first point and a second point that come into contact with the first guide pin when the discharged valve moves up and down with respect to the horizontal direction of the discharge valve.

The first point and the second point individually come into contact with the first guide pin in the diameter direction of the first guide pin.

The first point and the second point are moved with respect to the horizontal direction of the discharge valve.

The compressor further includes a second guide pin provided at an opposite side of the discharge port in the radial direction of the discharge port, and the discharge valve further includes a second through hole allowing the second guide point to pass therethrough.

The compressor further includes a second guide pin and a third guide point provided at outsides of the discharge port, and the discharge valve further includes a second through hole allowing the second guide pin to pass through and a third through hole allowing the third guide pin to pass therethrough.

The second through hole includes a third point and a fourth point that come into contact with the second guide pin when the discharge valve obliquely moves upward and downward with respect to a horizontal direction of the discharge valve, and the third point and the fourth point individually come into contact with the second guide pin in the diameter direction of the second guide pin.

At least two of the first to fourth points restrict the discharge valve from being obliquely moved up and down with respect to the horizontal direction of the discharge valve.

The first through hole has a circular shape, the first guide pin has a cylindrical shape, and a difference between a radius of a periphery of the first through hole and a radius of an outer circumferential surface of the first guide pin is in a range of 0.2 mm to 0.5 mm.

The first guide pin includes material having a hardness greater than a hardness of the discharge valve.

A height of the first guide pin has a length corresponding to about 110% to 150% relative to a size value of a discharge cross-section of the discharge port.

The compressor further includes a valve stopper for restricting movement of the discharge valve during upward movement of the discharge valve, and a time taken for the discharge valve to close the discharge port by moving downwards from the valve stopper is less than 0.5 seconds.

The compressor according to the aspect of the present disclosure includes: a fixed scroll constituting a compression chamber together with an orbiting scroll and including a discharge port through which a refrigerant compressed in the compression chamber is discharged; and a valve unit including a discharge valve configured to open and close the discharge port by moving upward and downward and a first guide pin and a second guide pin configured to guide the discharge valve, wherein the discharge valve includes a first through hole allowing the first guide pin to pass therethrough and a second through hole allowing the second guide pin to pass therethrough and each of the first through hole and the second through hole includes two points that come into contact with a pair of the guide pins when the discharged valve moves up and down with respect to the horizontal direction of the discharge valve, and at least two of the two points of the first through hole and the two points of the second through hole restrict the discharge valve from being obliquely moved with respect to the horizontal direction of the discharge valve.

The first guide pin is arranged at one side of the discharge port, and the second guide pin is arranged at a side opposite to the first guide pin of the discharged port in a radial direction of the discharge port.

The two points of the first through hole includes a first point adjacent to the discharge port and a second point arranged at a side radially opposite to the first point of the first through hole, and the two points of the second through hole includes a third point adjacent to the discharge port and a fourth point arranged at a side radially opposite to the third point of the second through hole.

At least one of the second point and the fourth point comes into contact with at least one of the first guide pin and the second guide pin when the discharge valve obliquely moves up and down with respect to the horizontal direction of the discharge valve.

The first point and the second point individually come into contact with the first guide pin when the discharge valve obliquely moves up and down with respect to the horizontal direction of the discharge valve.

The third point and the fourth point individually come into contact with the second guide pin when the discharge valve obliquely moves up and down with respect to the horizontal direction of the discharge valve.

The first through hole has a circular shape, the first guide pin has a cylindrical shape, and a difference between a radius of a periphery of the first through hole and a radius of an outer circumferential surface of the first guide pin is in a range of 0.2 mm to 0.5 mm.

The first guide pin includes material having a hardness greater than a hardness of the discharge valve.

The compressor according to the aspect of the present disclosure includes: a fixed scroll constituting a compression chamber together with an orbiting scroll and including a discharge port through which a refrigerant compressed in the compression chamber is discharged; and a valve unit including a discharge valve configured to open and close the discharge port by moving upward and downward and a first guide pin configured to guide the discharge valve and having a cylindrical shape, wherein the discharge valve includes a first through hole allowing the first guide pin to pass therethrough and a difference between a radius of a periphery of the first through hole and a radius of an outer circumferential surface of the first guide pin is in a range of 0.2 mm to 0.5 mm.

Advantageous Effects

According to the above-described aspects of the present disclosure, the compressor can improve the durability of a discharge valve and reducing noise during operation of the compressor by controlling an oblique motion of the discharge valve with respect to the horizontal direction during upward and downward movement of the discharge valve so that stable driving of the discharge valve is realized.

MODE FOR DISCLOSURE

Figure 1:
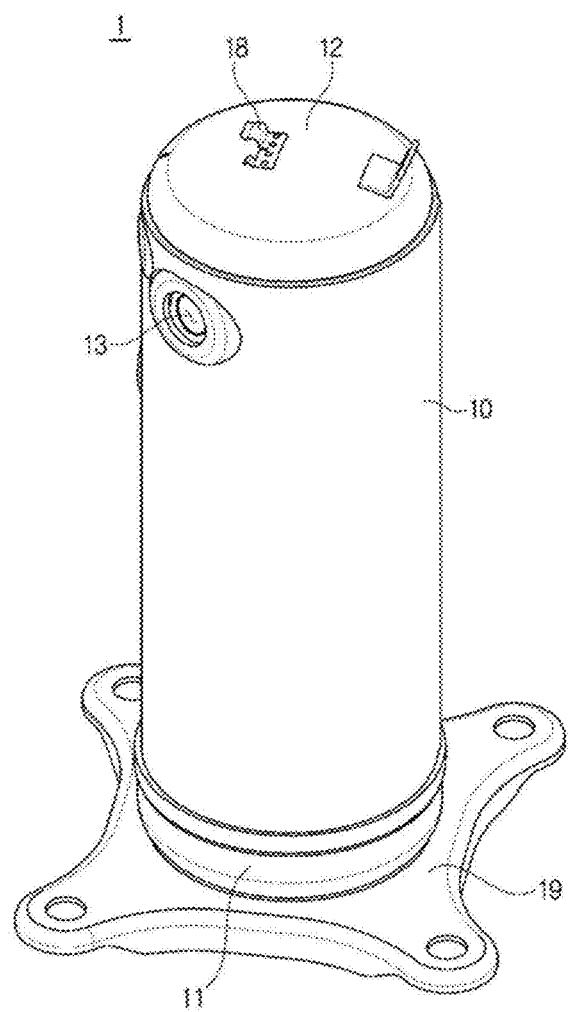
FIG. 1 is a perspective view illustrating a compressor according to an embodiment of the present disclosure.

Embodiments and features as described and illustrated in the disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, embodiments according to the present disclosure will be described in detail with reference to the accompanying drawings.

Figure 2:
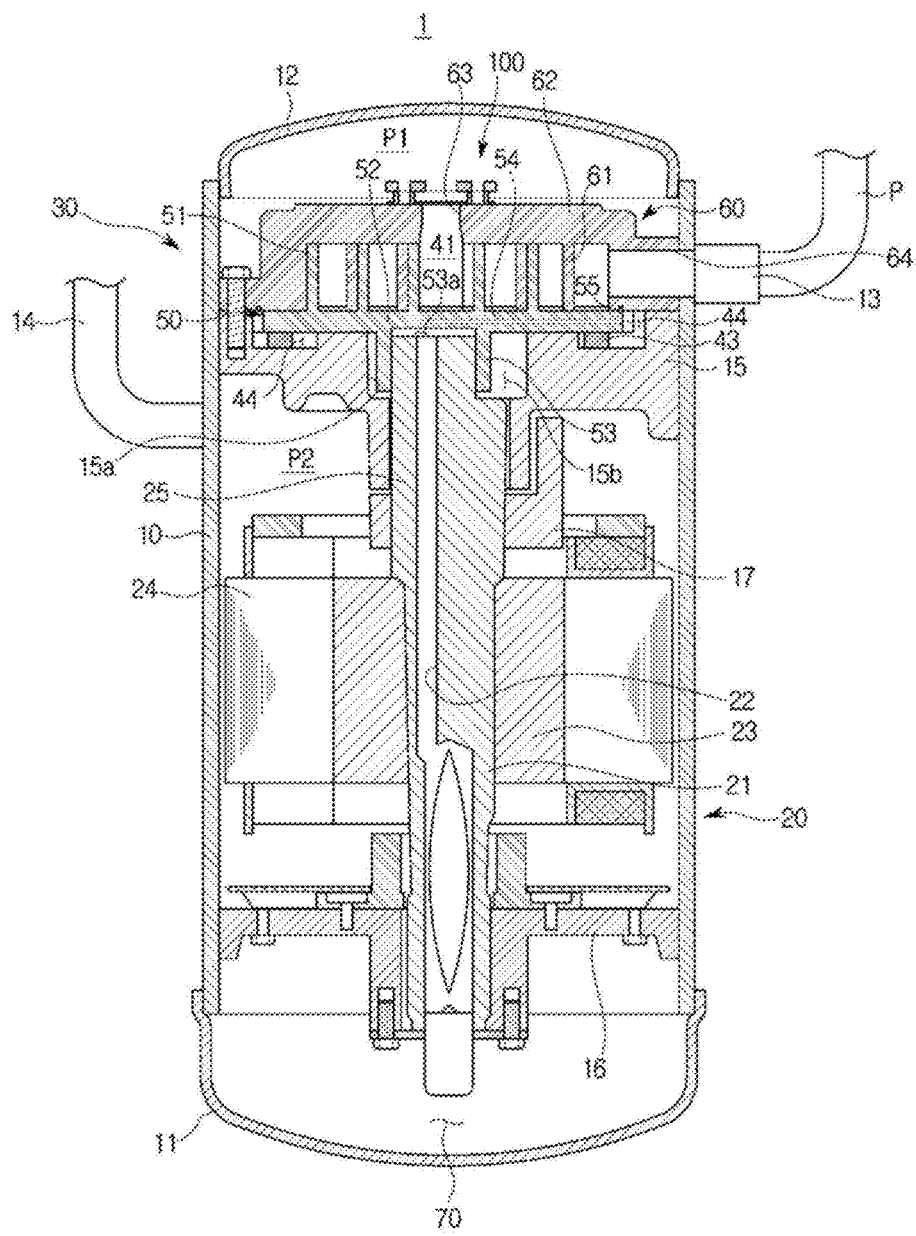
FIG. 2 is a side cross-sectional view illustrating a compressor according to an embodiment of the present disclosure.
Figure 3:
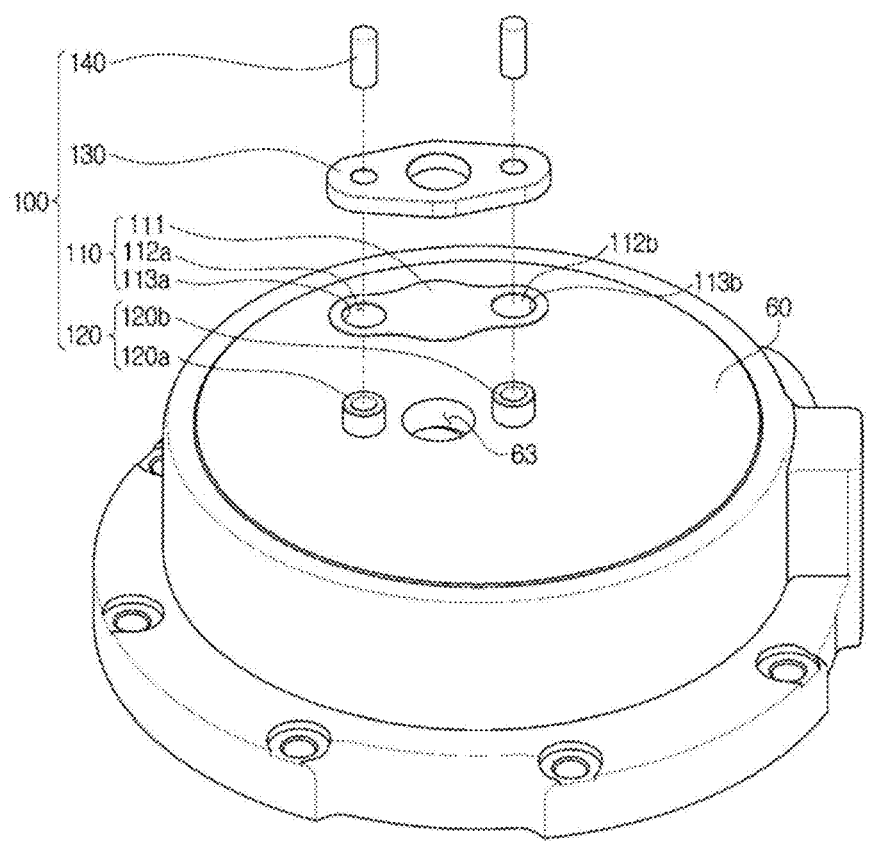
FIG. 3 is an exploded perspective view illustrating a valve unit of a compressor according to an embodiment of the present disclosure.
Figure 4:
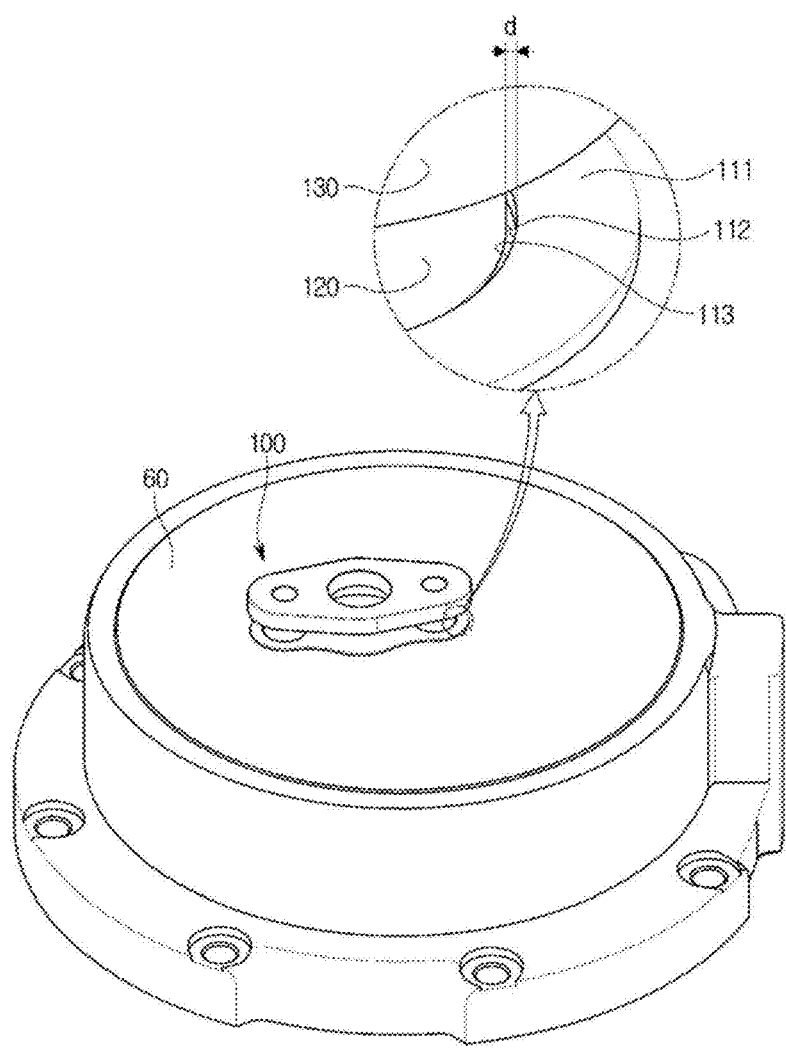
FIG. 4 is a perspective view illustrating a valve unit of a compressor according to an embodiment of the present disclosure.

Referring to FIGS. 1 and 2, a compressor 1 may include a main body 10 having a closed internal space, and a driving unit 20 and a compression unit 30 located inside the main body 10. The compressor 1 may be provided on the outer surface thereof with a fixing member 18 fixed to an outdoor unit of an air conditioner or the like. Further, the compressor 1 may be provided with a bottom plate 19 that is stably seated on and fixed to the floor surface.

The main body 10 is provided at one side thereof with an inlet 13 allowing a refrigerant to be introduced therethrough and is provided at the other side thereof with an outlet 14 allowing a refrigerant introduced through the inlet 13 and compressed to be discharged to the outside. An upper cap 12 and a lower cap 11 for sealing the inside of the main body 10 may be mounted on a upper portion and a lower portion of the main body 10.

The driving unit 20 includes a stator 24 press-fitted into a lower side of the main body 10 and a rotor 23 rotatably installed at the center of the stator 24. Balance weights 17 are provided on upper and lower portions of the rotor 23 to control the imbalanced rotation during rotation of the rotor 23.

An upper flange 15 and a lower flange 16 are fixed to upper and lower portions of the inside of the main body 10, respectively. The driving unit 20 may be positioned between the upper flange 15 and the lower flange 16. A rotary shaft 21 is mounted between the upper flange 15 and the lower flange 16 to transmit a rotational force generated from the driving unit 20 to an orbiting scroll 50 of the compression unit 30. On an upper end of the rotary shaft 21, an eccentric portion 25 is provided at a side away from the center of the rotary shaft 21.

The upper flange 15 is provided at the center thereof with a through hole 15a that allows the rotary shaft 21 to pass therethrough. An oil reservoir 15b may be formed around the through hole 15a to store oil suctioned through the rotary shaft 21. An oil transfer pipe 22 may be formed through the inside of the rotating shaft 21 in the axial direction of the rotating shaft 21. An oil pump (not shown) may be installed at a lower end portion of the oil transfer pipe 22.

The compression unit 30 may include a fixed scroll 60 and an orbiting scroll 50 that performs an orbiting motion relative to the fixed scroll 60 to compress the refrigerant introduced into the main body 10. The fixed scroll 60 may be fixedly coupled to the main body 10 to be located above the upper flange 15, and the orbiting scroll 50 may be located between the fixed scroll 60 and the upper flange 15 to perform orbiting motion with respect to the fixed scroll 60. The orbiting scroll 50 is inserted around the rotary shaft 21 to be operated by the rotary shaft 21, and is provided at an upper surface thereof with an orbiting wrap 51 having a spiral shape. The fixed scroll 60 is provided at a lower surface thereof with a fixed wrap 61 to be engaged with the orbiting wrap 51 of the orbiting scroll 50.

As the orbiting wrap 51 and the fixed wrap 61 are engaged with each other, the orbiting scroll 50 and the fixed scroll 60 form a compression chamber 41. An Oldham's ring receiving portion 44 may be provided between the orbiting scroll 50 and the upper flange 15. An Oldham's ring 43 may be received in the Oldham's ring receiving portion 44 to allow the orbiting scroll 50 to turn without revolving on its own axis.

The inside of the main body 10 is divided into an upper side portion P1 and a lower side portion P2 by the upper flange 15 and the fixed scroll 60. The upper side portion P1 and the lower side portion P2 both have a high pressure state. The fixed scroll 60 is provided at one side thereof with a suction port 64 for communicating with a gas suction pipe P connected to the inlet 13 and at the center of an upper surface thereof with a discharge port 63 for discharging a refrigerant compressed in the compression chamber 41 to the upper side portion P1 of the main body 10. In this case, preferably, the discharge port 63 may be provided with a valve unit 100 for opening and closing the discharge port 63 to prevent discharged refrigerant gas from flowing backward. Details of the valve unit 100 will be described below.

In the compressor 1 with power applied thereto, the rotary shaft 21 rotate together with the rotor 23, and the orbiting scroll 50 coupled to the upper end portion of the rotary shaft 21 rotates. The rotation of the orbiting scroll 50 is an orbiting motion having a turning radius, which is the distance from the center of the rotary shaft 21 to the center of the eccentric portion 24. In this case, the revolving of the orbiting scroll 50 is prevented by the Oldham's ring 4343.

The orbiting scroll 50 includes an orbiting plate 52 having a predetermined thickness and area, an orbiting wrap 51 having a predetermined thickness and height and formed on an upper surface of the orbiting plate 52, and a boss portion 53 formed on a lower surface of the orbiting plate 52. The boss portion 53 may have a shape of a hollow 53a.

The orbiting plate 52 supporting the orbiting wrap 51 may be provided at an inside thereof with an oil transfer passage 54 connected to the oil transfer pipe 22. In detail, the oil transfer passage 54 may have one end in which an oil supply port 55 is formed that moves together with the orbiting scroll 50 in a unitary assembly. The oil transfer passage 54 may have another end that is directed to the hollow 53a of the boss portion 53 to be connected to the oil transfer pipe 22.

An orifice pin is provided on the oil transfer passage 54 to form a pressure difference with the outside of the oil supply port 55 so that the oil may be discharged onto the orbiting scroll 50 by passing through the oil supply port 55.

The fixed scroll 60 includes a body 62 having a predetermined shape, a fixed wrap 61 having a predetermined thickness and height and formed inside the body 62, a discharge port 63 formed through the center of the body 62, and a suction port 64 formed through one side of the body 62.

As the orbiting scroll 50 performs orbiting motion relative to the fixed scroll 60, the compression chamber 41 is formed between the orbiting wrap 51 and the fixed wrap 61. The compression chamber 41 is moved to the center by the continuous orbiting motion of the orbiting scroll 50 so that the volume thereof is reduced to compress the refrigerant suctioned into the compression chamber 41.

In the compression chamber 41, the refrigerant is moved toward the center of the fixed scroll 60 and the orbiting scroll 50 according to rotation of the orbiting scroll 50 with a volume reduced and a pressure decreased, making a high-pressure and high-temperature refrigerant.

The high-pressure and high-temperature refrigerant is discharged from the compression chamber 41 toward the upper side portion of the compressor 1 through the discharge port 63 provided on the upper central portion of the fixed scroll 60 and is discharged to the outside of the compressor 1 through the outlet 14.

During the operation of the compressor 1, a high-pressure and high-temperature refrigerant may be formed through a motion of the orbiting scroll 50 that allows the volume of the compression chamber 41 to be reduced with the compression chamber being moved toward the central portion through the orbiting motion of the orbiting scroll 50, and the refrigerant may be discharged to the outside of the discharge port 63 due to the difference in pressure between the compression chamber 41 and the outside of the discharge port 63.

However, when the compressor 1 stops operating, the pressure difference between the compression chamber 41 and the outside of the discharge port 63 decreases, and the high-temperature and high-pressure refrigerant may flow backward to the compression chamber 41 through the discharge port 63.

In order to prevent such a backflow, the valve unit 100 may be provided at the upper portion of the discharge port 63. The valve unit 100 will be described in detail below.

Referring to FIGS. 3 to 6, the valve unit 100 includes a discharge valve 110 that is moved upward and downward from the upper side of the discharge port 63 by the discharge of the refrigerant, guide pins 120a and 120b for guiding the movement of the discharge valve 110, a valve stopper 130 for restricting the upward movement of the discharge valve 110, and fixing members 140 for fixing the guide pins 120a and 120b and the valve stopper 130 to the fixed scroll 60.

The discharge valve 110 may reciprocate upward and downward from the upper side of the discharge port 63 in the process of the refrigerant being discharged. The discharge valve 110 may include a body 111 for opening and closing the discharge port 63 and through holes 112a and 112b allowing the guide pins 120a and 120b to pass therethrough. Details thereof will be described below.

The guide pins 120a and 120b may guide a movement path of the discharge valve 110 such that the discharge valve 110 may move up and down. In detail, the guide pins 120a and 120b extend upward from the upper surface of the fixed scroll 60, and by passing through the through holes 112a and 112b, guide the discharge valve 110 to be moved up and down.

The guide pins 112a and 112b may have a Rockwell scale C (HRC) hardness of 55 or greater. In addition, the hardness of the guide pins 112a and 112b may be provided to be larger than that of the discharge valve 110. In this case, the discharge valve 110 may have a hardness of about HRC 50.

Inner circumferences 113a and 113b of the through holes 112a and 112b may have radii larger than those of outer circumferences of the guide pins 120a and 120b by a spaced distance d. In other words, the through holes 112a and 112b may have cross-sectional areas larger than those of the guide pins 120a and 120b. Accordingly, the discharge valve 110 may be guided by the guide pins 120a and 120b to be easily moved up and down.

A spaced distance d may be provided in a range of 0.2 mm to 0.5 mm. When the spaced distance d is less than 0.2 mm, the assembly performance allowing the guide pins 120a and 120b to pass through the through holes 112a and 112b may be lowered, causing difficulty in the manufacturing process. The spaced distance d being equal to or greater than 0.5 mm leads to difficulty in restricting the discharge valve 110 from being obliquely moved with respect to the horizontal direction during the up and down movement, which may increase noise and vibration.

The spaced distance d and the oblique movement of the discharge valve 110 with respect to the horizontal direction will be described below in detail.

The valve stopper 130 is located at the upper end side of the guide pins 120a and 120b to restrict upward movement of the discharge valve 110 such that the discharge valve 110 moved upward along the guide pins 120a and 120b is prevented from being separated from the guide pins 120a and 120b.

The fixing members 140 are inserted into through holes provided inside the valve stopper 130 and the guide pins 120a and 120b to thereby fix the valve stopper 130 and the guide pins 120a and 120b to the upper end of the fixed scroll 60. The fixing member 140 may be provided in the shape of a rivet or a screw to achieve a screw coupling.

Figure 5:
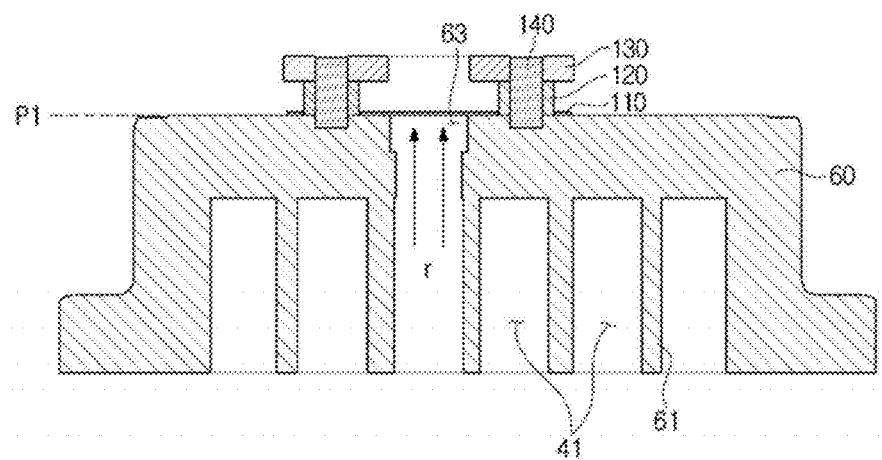
FIG. 5 is a view illustrating a state in which a valve unit of a compressor closes a discharge port according to an embodiment of the present disclosure.

Referring to FIG. 5, before a refrigerant r is discharged, the discharge valve 110 is positioned at a lower position P1 so that the discharge port 63 is kept closed. Thereafter, the compressor 1 is driven, and the high-temperature and high-pressure refrigerant flows to the central portion of the compression chamber 41 and then to the discharge port 63.

Figure 6:
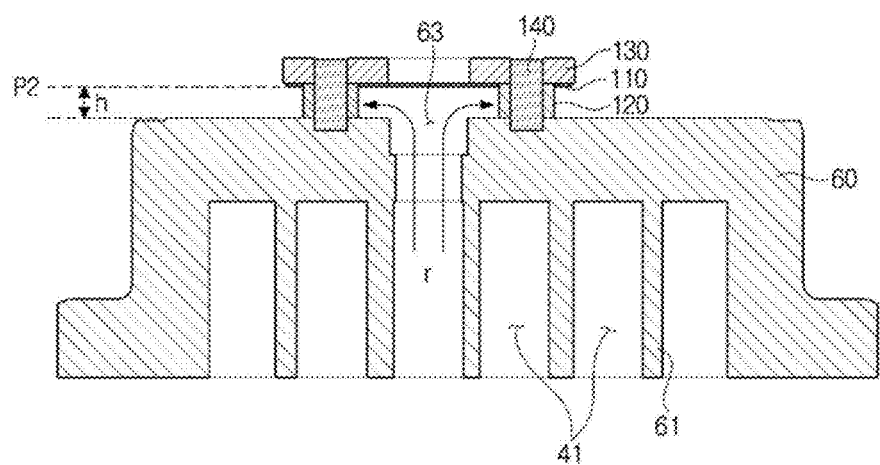
FIG. 6 is a view illustrating a state in which a valve unit of a compressor opens a discharge port according to an embodiment of the present disclosure.

Referring to FIG. 6, the high-temperature and high-pressure refrigerant flowing to the discharge port 63 strikes the lower surface of the discharge valve 110 adjacent to the discharge port 63, thereby exerting a pressure on the discharge valve 110 upward.

With the pressure exerted on the discharge valve 110 upward, the discharge valve 110 is moved upward, so that a section between the discharge valve 110 and the discharge port 63 may be opened. The refrigerant may be discharged to the outside of the fixed scroll 60 by passing through the discharge port 63 and then through the opened section.

The discharge valve 110 moved upward by the pressure of the refrigerant may be provided at a position P2 contacting the lower side of the valve stopper 110. Accordingly, the refrigerant passing through the discharge port 63 may be discharged to the outside through a space defined by the height h between the first position P1 and the second position P2 of the discharge valve 110.

Thereafter, when the driving of the compressor 1 is completed and the refrigerant is not discharged from the compression chamber 41, there is no force to push the discharge valve 110 upward, so that the discharge valve 110 is moved downward again to the position P1 closing the discharge port 63.

The length of the height h of the guide pins 120a and 120b defined as a distance between the first position P1 and the second position P2 may be provided in a ratio of 110% to 150% of the cross-sectional area of the discharge port 63.

When the value of the height h is less than 110% of the cross sectional area of the discharge port 63, the area of the discharge passage of the refrigerant discharged through the discharge port 63 is reduced and thus the resistance of the discharge passage is increased, which causes the performance of the compressor 1 to be degraded.

Alternatively, when the value of the height h is equal to or greater than 150% of the cross sectional area of the discharge port 63, upon the operation of the compressor 1 being stopped and the refrigerant not discharged, the time taken for the discharge valve 110 to move from the second position P2 to the first position P1 is increased. Accordingly, in a state in which the discharge valve 110 does not return to the first position P1, the refrigerant may flow backward and be suctioned into the discharge port 63. Accordingly, the value of the height h may be set to be in a range of 110% to 150% of the cross sectional area of the discharge port 63.

In the case of the conventional valve unit, a discharge valve of a valve unit is moved up and down as the outer edge of the discharge valve is guided by a guide member. That is, the discharge valve may be freely moved up and down by the pressure of the refrigerant discharged from an inner space of the guide member provided by the guide member.

The discharge valve being moved up and down by the refrigerant discharged at a high pressure may be obliquely moved up and down with respect to the horizontal direction of the upper surface of the fixed scroll without maintaining a level state with respect to the upper surface of the fixed scroll.

In an excessive operating condition of the compressor having a high speed or a high pressure, up-down movement of the discharge valve due to rapid discharge of the refrigerant may occur excessively. Since the upward and downward movement of the discharge valve is unstable, an upper portion of the fixed scroll, that is, one side of the upper portion of the fixed scroll adjacent to the discharge port may be excessively struck by the discharge valve.

Accordingly, the one side of the upper portion of the fixed scroll or one side of the discharge valve striking the one side of the upper portion of the fixed scroll may be excessively worn, and the reliability of the compressor operation may be lowered.

That is, the frictional force of the discharge valve and the magnitude of the collision force may not be controlled, so that the reliability of the discharge valve may be reduced. In addition, since the behavior of the discharge valve is unstable, noise may be increased due to irregular up and down reciprocation of the discharge valve.

Accordingly, the compressor 1 according to the embodiment of the present disclosure may include the valve unit 100 capable of reducing the collision force and the frictional force of the discharge valve 110 by restricting the discharge valve 110 from being obliquely moved up and down.

The guide pins 120a and 120b for guiding the discharge valve 110 may be provided to pass through the discharge valve 110. In detail, the first guide pin 120a is arranged at an outside of the discharge port 63, and the second guide pin 120b is arranged at a side opposite to the first guide pin 120a in the radial direction of the discharge port 63.

The discharge valve 110 may include a first through hole 112a allowing the first guide pin 120a to pass therethrough and a second through hole 112b allowing the second guide pin 120b to pass therethrough.

The discharge valve 110 may be provided at a central portion with a surface that has an area wider than the outer circumference of the discharge port 63 to open and close the discharge port 63 and extends toward the first guide pin 120a and the second guide pin 120b. The discharge valve 110 may have a shape symmetrically extending toward the first guide pin 120a and the second guide pin 120b about the discharge port 63.

That is, the discharge valve 110 is provided with the first through hole 112a and the second through hole 112b at positions symmetrical to each other about the discharge port 63 in the radial direction of the outer circumference of the discharge port 63, and the body 111 may also be provided in a symmetrical shape in the directions in which the first through hole 112a and the second through hole 112b are arranged about the discharge port 63.

Accordingly, when the discharge valve 110 moves up and down obliquely to a level surface parallel to the upper surface of the fixed scroll 60, the inclination of the discharge valve 110 is restricted to a certain degree by the first guide pin 120a and the second guide pin 120b passing through the discharge valve 110

That is, when the discharge valve 110 moves up and down while being inclined at a predetermined angle or greater, a first inner circumferential surface 113a of the first through hole 112a and a second inner circumferential surface 113b of the second through hole 112b come into contact with the first guide pin 120a and the second guide pin 120b to prevent the discharge valve 110 from being obliquely moved up and down.

As described above, radii of the inner circumferential surfaces 113a and 113b of the through holes 112a and 112b are set to be longer than the radii of the outer circumferences of the guide pins 120a and 120b by a spaced distance d so that the discharge valve 110 is easily moved up and down by being guided by the guide pins 120a and 120b.

When the discharge valve 110 is obliquely moved up and down with respect to the upper surface of the fixed scroll 60 or a horizontal direction of the discharge valve 110 at a time of the discharge port 63 being closed, the lengths of the radii of the guide pins 120a and 120b with respect to the diameter direction of the through holes 112a and 112b increase so that the spaced distance d becomes zero, causing the first and second guide pins 120a and 120b to make contact with the first and second inner circumferential surface 113a and 113b.

The discharge valve 110 may not be moved up and down when the spaced length d is 0. However, the repeated applications of pressure of the discharge refrigerant allows the discharge valve 110 to be moved in the direction of decreasing the inclination angle, so that the spaced distance d increases to be greater than 0, and as the spaced distance d is secured, the discharge valve 110 may be moved up and down again.

That is, a predetermined spaced distance d is provided between the through holes 112a and 112b and the guide pins 120a and 120b so that the discharge valve 110 may be moved up and down, and when a predetermined angle or greater of the inclination is formed, the spaced distance d becomes zero so that the up and down movement of the discharge valve 110 may be restricted.

In addition, with the movement of the discharge valve 110 restricted, the pressure of the refrigerant allows the discharge valve 110 to be moved in the direction of decreasing the inclination angle such that the inclination angle with respect to the horizontal direction may be maintained in a predetermined range during up and down movement of the discharge valve 110.

Figure 7:
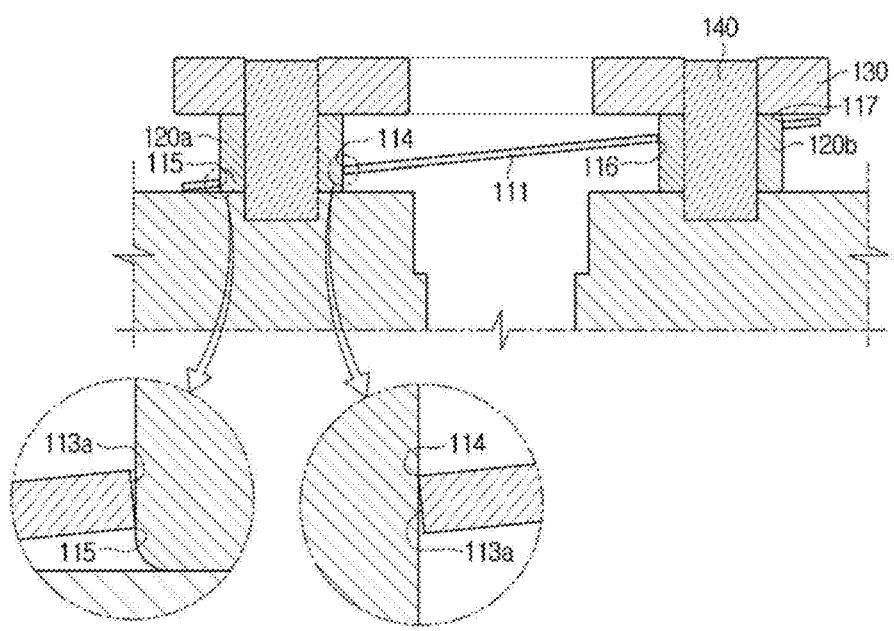
FIG. 7 is a view illustrating a state in which a discharge valve of a valve unit of a compressor according to the embodiment of the present disclosure is obliquely moved.

In detail, referring to FIG. 7, when the discharge valve 110 is obliquely moved upward with a side adjacent to the second guide pin 120b being higher than a side adjacent to the first guide pin 120a, the first guide pin 120a comes into contact with the first circumferential surface 113a and the second guide pin 120b comes into contact with the second inner circumferential surface 113b.

At this time, the first inner circumferential surface 113a may include a first point 114 coming into contact with the first guide pin 120a and a second point 115 arranged at a side opposite to the first point 114 in the radial direction of the first inner circumferential surface 113a and coming into contact with the first guide pin 120a.

When the discharge valve 110 has only a single point coming into contact with the first guide pin 120, the movement of the discharge valve 110 may not be restricted only through the single point and thus the inclination angle of the discharge valve 110 with respect to the horizontal 1 direction may not be restricted.

However, the discharge valve 110 according to the embodiment of the present disclosure includes the first point 114 and the second point 115 arranged on the first inner circumferential surface 113a at opposite sides in the radial direction of the first guide pin 120a so as to restrict oblique movement of the discharge valve 110.

In addition, the second inner circumferential surface 113b may include a third point 116 coming into contact with the second guide pin 120b and a fourth point 117 arranged on the second inner circumferential surface 113b at a side opposite to the third point 116 in the radial direction of the second circumferential surface 113b and coming into with the second guide pin 120b.

Accordingly, when the discharge valve 110 is obliquely moved upward with respect to the horizontal direction, the behavior of the discharge valve 110 may be restricted by the first to fourth points 114 to 117 arranged on the first inner circumferential surface 113a and the second inner circumferential surface 113b.

In other words, the movement of the discharge value 110 may be restricted as all of the first to fourth points 114 to 117 come into contact with the guide pins 120a and 120b as shown in FIG. 7.

However, the present disclosure is not limited thereto, at least two of the first to fourth points 114, 115, 116 and 117 may come into contact with the guide pins 120a and 120b depending on the inclination angle of the discharge valve 110, and restrict the movement of the discharge valve 110.

That is, the discharge valve 110 is moved by the refrigerant discharged from the discharge port 63, and when the refrigerant is unevenly discharged, the discharge valve 110 may be shifted a predetermined distance in the horizontal direction and obliquely moved up and down with respect to the horizontal direction at the shifted position, not only being obliquely moved up and down with respect to the horizontal direction in place.

In this case, a spaced distance d between the first inner circumferential surface 113a and the first guide pin 120a and a spaced distance d between the second inner circumferential surface 113b and the second guide pin 120b may be set to be different from each other, so that any two of the first to fourth points 114 to 117 may first come into contact with the guide pins 120a and 120b to restrict the movement of the discharge valve 110.

In detail, when the first point 114 and the second point 115 come into contact with the first guide pin 120a, the movement of the discharge valve 110 may be restricted regardless of whether the third point 116 and the fourth point 117 come into contact with the second guide pin 120b.

In addition, when the third point 116 and the fourth point 117 come into contact with the second guide pin 120b, the movement of the discharge valve 110 may be restricted regardless of whether the first point 114 and the second point 115 come into contact with the first guide pin 120a.

In addition, when the second point 115 and the fourth point 117 come into contact with the first guide pin 120a and the second guide pin 120b, respectively, the movement of the discharge valve 110 may be restricted regardless of whether the first point 114 and the third point 116 come into contact with the guide pins 120a and 120b.

In addition, when the second point 115 and the third point 116 come into contact with the first guide pin 120a and second guide pin 120b, respectively, the movement of the discharge valve 110 may be restricted regardless of whether the first point 114 and the fourth point 117 come into contact with the guide pins 120a and 120b.

In addition, when the first point 114 and the fourth point 117 come into contact with the first guide pin 120a and the second guide pin 120b, the movement of the discharge valve 110 may be restricted regardless of whether the second point 115 and the third point 116 come into contact with the guide pins 120a and 120b.

The above may also apply to a case in which the discharge valve 110 is obliquely moved up and down while having a side thereof adjacent to the first guide pin 120a to be higher than a side thereof adjacent to the second guide pin 120b unlike FIG. 7.

According to another embodiment, the discharge valve 110 having the first through hole 120a and the second through hole 120b unsymmetrical to each other different from the embodiment of the present disclosure may also restrict the inclination angle of the discharge valve 110 by at least two of the first to fourth points 114 to 117.

Figure 8:
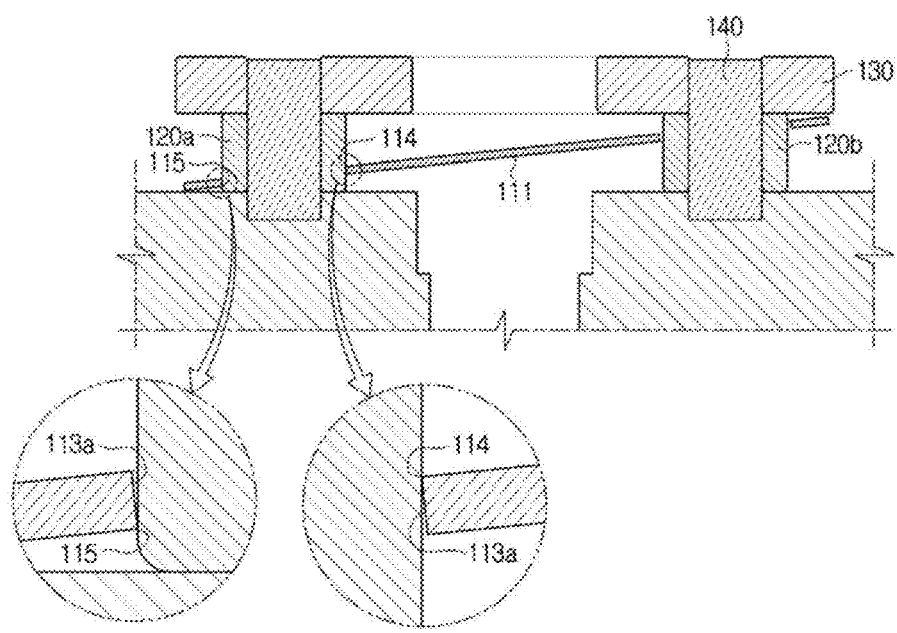
FIG. 8 is a view illustrating a state in which a discharge valve of a valve unit of a compressor according to another embodiment of the present disclosure is obliquely moved.

Referring to FIG. 8, the discharge valve 110 according to the embodiment of the present disclosure may include a first through hole 120a and a second through hole 210b which are unsymmetrical to each other. The unsymmetrical first and second through holes 120a and 120b may be implemented not only by having different diameters from each other as shown in FIG. 8 but also by being arranged at positions that are not diametrically symmetrical about the discharge hole 63.

In the case of the discharge valve 110 having the first and second through holes 120a and 120b in different diameters, when the first point 114 and the second point 115 come into contact with the first guide pin 120a, the discharge valve 110 may be restricted from being obliquely moved with respect to the horizontal direction regardless of whether the third point 116 and the fourth point 117 come into contact with the second guide pin 120b.

Since the second through hole 120b having a diameter larger than that of the first through hole 120a has a spaced distance d between the second circumferential surface 113b and the second guide pin 120b compared to a spaced distance d of the first through hole 120a, even when the first point 114 and the second point 115 come into contact with the first guide pin 120a, the third point 116 and the fourth point 117 may not come into contact with the second guide pin 120b.

Even when the third point 116 and the fourth point 117 do not come into contact with the second guide pin 120b, oblique movement of the discharge valve 110 may be restricted the first and second points 114 and 115.

When the discharge valve 110 is shifted a predetermined distance in the horizontal direction and obliquely moved up and down with respect to the horizontal direction, the oblique movement of the discharge valve 110 is restricted by contact of any two of the four points 114, 115, 116, and 117 with at least one of the first and second guide pins 120a and 120b rather than contact of two points of any one of the through holes having a smaller distance d with the guide pin 120 or 120b.

Figure 9:
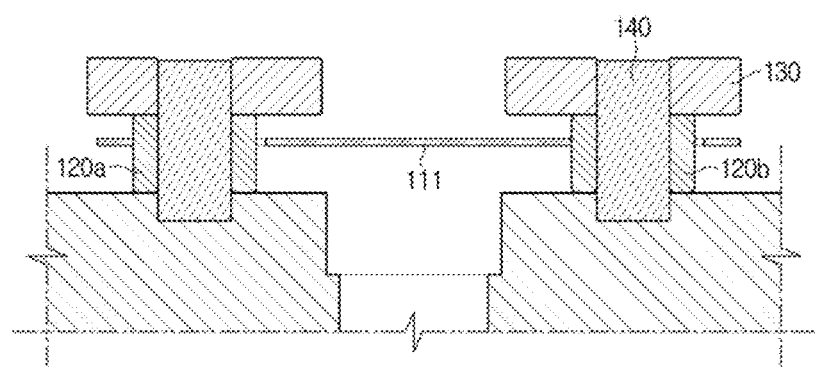
FIG. 9 is a view illustrating a state in which a discharge valve of a valve unit of a compressor according to an embodiment of the present disclosure is biased to one side.

When the refrigerant is unevenly discharged to one side, the discharge valve may be pushed in the horizontal direction. Referring to FIG. 9, when the refrigerant is discharged to a side adjacent the second guide pin 120b, the discharge valve 110 may be moved to a side adjacent the second guide pin 120b as being pushed by the refrigerant.

In this case, the second point 115 and the fourth point 117 come into contact with the first guide pin 120a and the second guide pin 120b, respectively, to thereby restrict the discharge valve 110 from being moved in the horizontal direction.

In contrast, when the refrigerant is discharged to a side adjacent to the first guide pin 120a, the discharge valve 110 is moved to a side adjacent to the first guide pin 120a as being pushed by the refrigerant, and the first point 114 and the third point 116 come in contact with the first guide pin 120a and the second guide pin 120b, respectively, so that the discharge valve 110 may be restricted from being moved in the horizontal direction.

Hereinafter, a valve unit 200 according to another embodiment of the present disclosure will be described. In the following description, configurations except for the valve unit 200, which are identical to those of the compressor 1 described in the above embodiment of the present disclosure, will be omitted.

Figure 10:
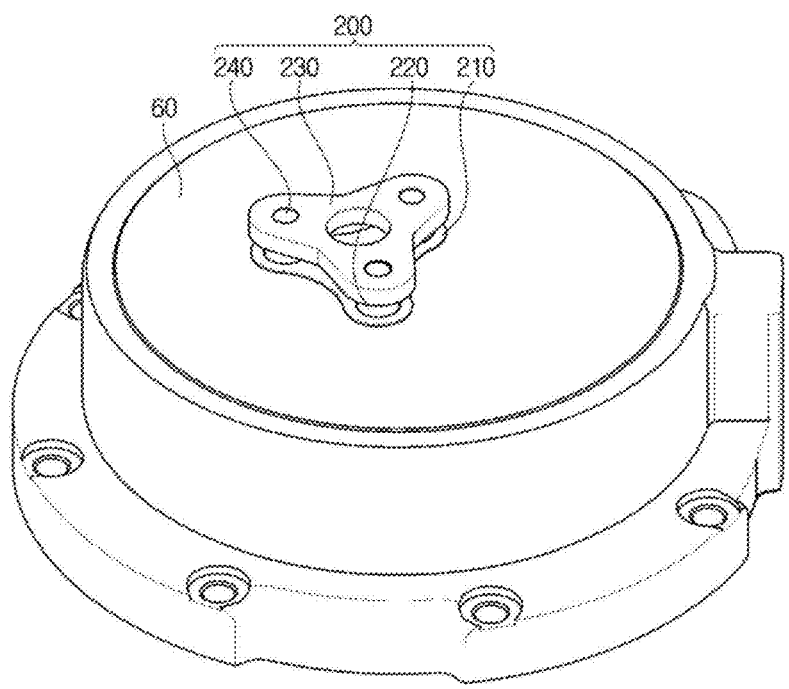
FIG. 10 is a perspective view illustrating a valve unit of a compressor according to another embodiment of the present disclosure.
Figure 11:
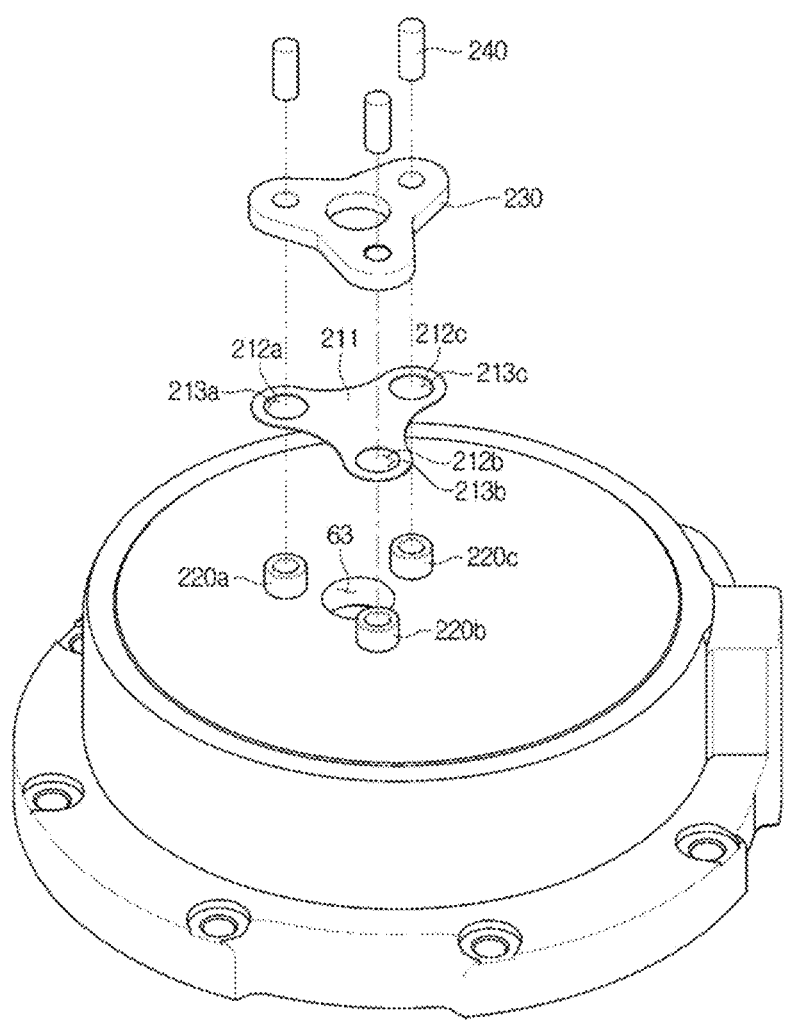
FIG. 11 is an exploded perspective view illustrating a valve unit of a compressor according to another embodiment of the present disclosure.

Referring to FIGS. 10 and 11, the valve unit 200 includes a discharge valve 210 that is moved up and down from an upper side of a discharge port 63 due to discharge of a refrigerant, three guide pins 220a, 220b, and 220c that guide movement of the discharge valve 210, a valve stopper 230 for restricting upward movement of the discharge valve 210, and a fixing member 240 for fixing the three guide pins 220a, 220b, and 220c and the valve stopper 230 to a fixed scroll 60.

The discharge valve 210 may reciprocate up and down from the upper side of the discharge port 63 in the process of the refrigerant being discharged. The discharge valve 210 may include a body 211 for opening and closing the discharge port 63 and three through holes 212a, 212b and 212c allowing the three guide pins 220a, 220b and 220c to pass therethrough.

The three guide pins 220a, 220b and 220c may guide the movement passage of the discharge valve 210 such that the discharge valve 210 may move up and down. In detail, the three guide pins 220a, 220b, and 220c may be arranged at substantially equal intervals about the discharge port 63 in the circumferential direction of the discharge port 63.

Accordingly, the three guide pins 220a, 220b and 220c include a first guide pin 220a disposed at one side outside the discharge port 63, a second guide pin 220b disposed at another side outside the discharge port 63, and a third guide pin 220c disposed at another side outside the discharge port 63.

The discharge valve 210 may be provided at a central side thereof with a surface that has an area wider than the outer circumference of the discharge port 63 to open and close the discharge port 63 and extends toward the first guide pin 220a, the second guide pin 220b, and the third guide pin 220c. The discharge valve 210 may have a shape symmetrically extending toward the first guide pin 220a, the second guide pin 220b, and the third guide pin 220c about the discharge port 63 in three directions.

That is, the discharge valve 210 is provided with a first through hole 212a, a second through hole 212b, and a third through hole 212c at symmetric positions in the diameter direction of the outer circumference of the discharge port 63, and the body 211 may also be formed to be symmetrical in directions in which the first through hole 212a, the second through hole 212b, and the third through hole 212c are arranged about the discharge port 63.

The discharge valve 210 or the three guide pins 220a, 220b, and 220c may be unsymmetrically formed, without being limited to the present embodiment of the present disclosure. However, the discharge valve 210 or the three guide pins 220a, 220b and 220c symmetrically formed may facilitate the discharge valve 210 being moving up and down while maintaining a horizontal level, and improve the reliability of the operation of the compressor 1. Accordingly, the discharge valve 210 or the three guide pins 220a, 220b and 220c may be preferably provided in a symmetrical fore When the discharge valve 210 obliquely moves up and down with respect to a horizontal direction of the upper surface of the fixed scroll 60, the inclination may be restricted to a certain degree by the first guide pin 220a, the second guide pin 220b, and the third guide pin 220c passing through the discharge valve 210

That is, when the discharge valve 210 obliquely moves up and down while being inclined at a predetermined angle or greater, a first inner circumferential surface 213a of the first through hole 212a, a second inner circumferential surface 213b of the second through hole 212b, and a third inner circumferential surface 213c of the third through hole 212c come into contact with the first guide pin 220a, the second guide pin 220b, and the third guide pin 220c, respectively, to prevent the discharge valve 210 from being obliquely moved up and down.

At least one of the three guide pins 220a, 220b and 220c comes into contact with a corresponding one of the first circumferential surface 213a, the second circumferential surface 213b, and the third circumferential surface 213c to restrict the discharge valve 210 from being obliquely moved up and down with respect to the horizontal direction.

The scope of the disclosure is not limited to the aforementioned embodiments. It will be understood by those skilled in the art that various changes in form and details may be made therein without departing from the spirit and scope of the disclosure as defined by the appended claims and their equivalents.

The invention claimed is:

1. A compressor comprising:
a fixed scroll forming a compression chamber together with an orbiting scroll and including a discharge port through which a refrigerant compressed in the compression chamber is discharged; and
a valve unit including a discharge valve configured to open and close the discharge port by moving upward and downward and first and second guide pins configured to guide the discharge valve,
the discharge valve including first and second through holes allowing the first and second guide pins, respectively, to pass therethrough, and the first and second through holes having different diameters so that edges of the first and second through holes come into contact with the first and second guide pins when the discharge valve obliquely moves upward and downward with respect to a horizontal direction of the discharge valve.

2. The compressor of claim 1, wherein the first through hole includes first and second points that come into contact with the first guide pin and the second point is located at a side opposite to the first point in a diametrical direction of the first guide pin.

3. The compressor of claim 2, wherein the first point and the second point individually come into contact with the first guide pin.

4. The compressor of claim 3, wherein the first point and the second point restrict the discharge valve from obliquely moving upward and downward with respect to the horizontal direction of the discharge valve.

5. The compressor of claim 1, wherein the second guide pin is provided at a side opposite to the discharge port in a radial direction of the discharge port.

6. The compressor of claim 5, wherein the second through hole includes a third point and a fourth point that come into contact with the second guide pin when the discharge valve obliquely moves upward and downward with respect to the horizontal direction of the discharge valve,
wherein the fourth point is arranged at a side opposite to the third point in a diametrical direction of the first guide pin.

7. The compressor of claim 6, wherein the third point and the fourth point individually come into contact with the second guide pin.

8. The compressor of claim 7, wherein at least two of the first to fourth points restrict the discharge valve from obliquely moving upward and downward with respect to the horizontal direction of the discharge valve.

9. The compressor of claim 7, wherein at least one of the second point and the fourth point comes into contact with at least one of the first guide pin and the second guide pin when the discharge valve obliquely moves upward and downward with respect to the horizontal direction of the discharge valve.

10. The compressor of claim 1, further comprising a third guide pin provided at an outer side of the discharge port,
wherein the discharge valve further includes a third through hole allowing the third guide pin to pass therethrough.

11. The compressor of claim 1, wherein the first through hole has a circular shape, the first guide pin has a cylindrical shape, and a difference between a radius of a periphery of the first through hole and a radius of an outer circumferential surface of the first guide pin is in a range of 0.2 mm to 0.5 mm.

12. The compressor of claim 1, wherein the first guide pin includes material having a hardness greater than a hardness of the discharge valve.

13. The compressor of claim 1, wherein a height of the first guide pin has a length corresponding to about 110% to 150% relative to a size value of a discharge cross-section of the discharge port.

14. The compressor of claim 1, further comprising a valve stopper for restricting movement of the discharge valve during upward movement of the discharge valve,
wherein a time taken for the discharge valve to close the discharge port by moving downwards from the valve stopper is less than 0.5 seconds.

* * * * *